(No Model.)

C. J. TAGLIABUE.
SYRINGE.

No. 524,962. Patented Aug. 21, 1894.

WITNESSES:
William Miller
Chas. E. Poenagen

INVENTOR:
Charles J. Tagliabue
BY
Hauff & Hauff
ATTORNEYS.

UNITED STATES PATENT OFFICE.

CHARLES J. TAGLIABUE, OF BROOKLYN, NEW YORK.

SYRINGE.

SPECIFICATION forming part of Letters Patent No. 524,962, dated August 21, 1894.

Application filed March 22, 1894. Serial No. 504,639. (No model.)

*To all whom it may concern:*

Be it known that I, CHARLES J. TAGLIABUE, a citizen of the United States, residing at Brooklyn, in the county of Kings and State of New York, have invented new and useful Improvements in Syringes, of which the following is a specification.

This invention relates to an improvement in syringes and the invention resides in the novel features of construction set forth in the following specification and claims and illustrated in the annexed drawings, in which—

Figure 1:
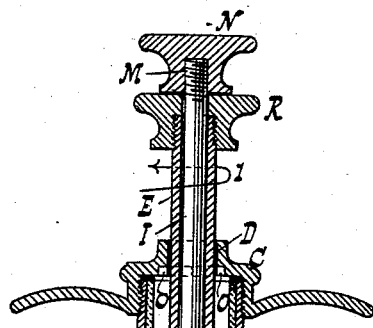
Figure 2:
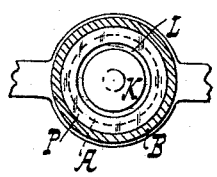
Figure 3:
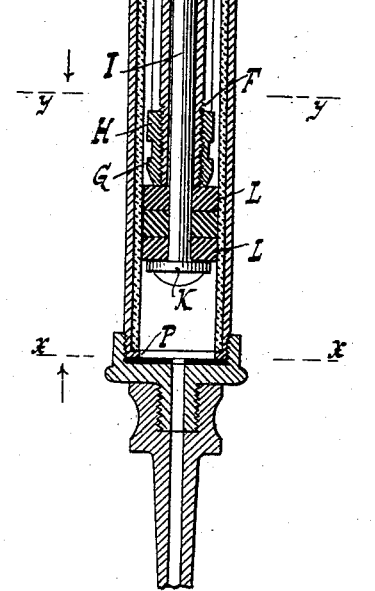
Figure 3:
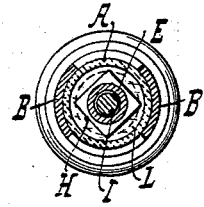

Figure 1 is a sectional elevation of the syringe. Fig. 2 is a section along $x$ $x$ Fig. 1. Fig. 3 is a section along $y$ $y$ Fig. 1.

The syringe barrel or cylinder A made usually of glass sits in a casing B usually of metal and the head C has a passage D for the play of the piston rod E. This rod E is tubular or hollow and has a screw thread F for the attachment or engagement of a nut G having an angular or non-circular head H. Through the hollow rod E extends a stem I headed at K. Between this head or flange K and nut G is a packing L readily formed by suitable washers of leather or like material. The stem I has a screw thread M engaged by a button N which latter prevents the stem I from slipping out of the tubular rod E. The head C has a socket or seat O shaped to conform to the head H of nut G and by drawing up the rod E to carry nut G toward head C the nut head H will catch or engage in socket O so as to be held against rotation. By now turning the rod E one way or another the nut G will run along screw thread F toward or from the head K so that the packing L is suitably spread or tightened, or loosened, as required.

The casing B has at its lower or needle end a flange P on which rests the barrel A. The bore of the flange P is such as to allow the stem I with its head K, and packing L to be withdrawn or removed through the lower part of barrel A, the stem I having been first freed by detaching the button N. The removal of button N will leave the stem I with head K and packing L free to be dropped or pressed down and removed from the lower end of the rod E and taken out of the barrel, the rod E remaining in the barrel until the nut G is unscrewed from the rod, leaving the latter free to be withdrawn through the opening D while the nut G will drop out at the lower end of barrel A. The packing and piston rod with its adjacent parts can thus be removed or replaced without unshipping or removing the barrel A from case B, which is objectionable as the glass barrel requires careful adjustment or packing in case B so as to avoid breakage and at the same time secure tight packing of the barrel so that no leakage will occur.

By threading the screws F M in opposite directions, making for example screw thread F right handed, and screw thread M left handed, then the rotation of rod E in the direction of arrow 1 to tighten nut G onto packing L will tend to rotate the button N in the same direction, so as to screw more firmly onto thread M or at any rate to avoid unscrewing of the button N. The rod E is shown with a button or handle R.

What I claim as new, and desire to secure by Letters Patent, is—

1. A syringe barrel and a casing having at its lower or needle end an inwardly turned flange for the support of one end of the barrel, combined with a piston rod having a packing made removable from the lower end of the rod, the bore of the flange being of such size as to allow the withdrawal of the packing from the lower or needle end substantially as described.

2. The combination of a cylinder provided at its upper end with an angular nut-engaging portion, a tubular screw-threaded piston-rod, a nut engaging the threaded part of the piston-rod and having an angular portion to engage the said nut-engaging portion, a stem extending through the piston-rod and having a head at its inner end, and a packing mounted on the stem between the said head and the said nut, substantially as and for the purposes described.

3. The combination of a cylinder provided at its upper end with an angular nut-engaging portion, a tubular screw-threaded piston-rod, a nut engaging the threaded part of the piston-rod and having an angular portion to engage the said nut-engaging portion, a stem extending through the piston-rod and having a head at its inner end, and a screw-plate M and button N at its outer end, and a packing arranged on the stem between the said head and the said nut, substantially as and for the purposes described.

4. The combination of a cylinder provided with a tubular screw-threaded piston-rod having a handle R, a nut G engaging the screw-threaded part of the piston-rod and adjustable thereupon, a stem extending through the tubular piston-rod and projecting beyond the outer end thereof, a head K on the inner end of the stem, a button N arranged on the outer end of the stem and adapted to bear against the handle on the piston-rod, and a packing arranged on the stem between the head thereof and the said adjustable nut, substantially as and for the purposes described.

5. The combination of a cylinder, a tubular screw-threaded piston-rod having a screw-threaded portion at its inner end, and a handle at its outer end, a nut engaging the screw-threaded part of the piston-rod and adjustable thereupon, a stem extending through the piston-rod and projecting beyond the outer end thereof, a head at the inner end of the stem, a button arranged on the outer end of the stem and adapted to bear against the handle of the piston-rod, and a head secured to the cylinder and having an angular portion to engage the said nut, substantially as and for the purposes described.

In testimony whereof I have hereunto set my hand in the presence of two subscribing witnesses.

CHARLES J. TAGLIABUE.

Witnesses:
 WM. C. HAUFF,
 E. F. KASTENHUBER.